US010379006B2

(12) United States Patent
Araki et al.

(10) Patent No.: US 10,379,006 B2
(45) Date of Patent: Aug. 13, 2019

(54) DATA GENERATION METHOD AND DATA GENERATION APPARATUS (71) Applicant: Kobe Steel, Ltd., Hyogo (JP)

(72) Inventors: Kaname Araki, Kobe (JP); Eiji Takahashi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 648 days.

(21) Appl. No.: 14/894,886

(22) PCT Filed: Jul. 14, 2014

(86) PCT No.: PCT/JP2014/068718
§ 371 (c)(1),
(2) Date: Nov. 30, 2015

(87) PCT Pub. No.: WO2015/019801
PCT Pub. Date: Feb. 12, 2015

(65) Prior Publication Data
US 2016/0109332 A1 Apr. 21, 2016

(30) Foreign Application Priority Data

Aug. 7, 2013 (JP) ................. 2013-163791

(51) Int. Cl.
G01M 17/02 (2006.01)
G01B 11/25 (2006.01)
(Continued)

(52) U.S. Cl.
CPC ......... *G01M 17/027* (2013.01); *B60C 99/006* (2013.01); *G01B 11/24* (2013.01); *G01B 11/2522* (2013.01)

(58) Field of Classification Search
CPC .. G01M 17/027; B60C 11/246; G01B 5/0025; G01B 11/2522
See application file for complete search history.

(56) References Cited

U.S. PATENT DOCUMENTS 6,539,789 B1 * 4/2003 Kostka .................. G01B 11/25
73/146
8,712,720 B2 * 4/2014 Nicholson ............. G01M 17/02
340/442
(Continued)

FOREIGN PATENT DOCUMENTS

JP 62-232507 A 10/1987
JP 2004-361344 A 12/2004
(Continued)

OTHER PUBLICATIONS

International Search Report and Written Opinion from PCT/JP2014/068718 dated Aug. 12, 2014.
(Continued)

Primary Examiner — Mohamed Charioui
Assistant Examiner — Catherine T. Rastovski
(74) Attorney, Agent, or Firm — Studebaker & Brackett PC (57) ABSTRACT A candidate extraction unit (322) executes candidate extraction processing wherein a fixed number of consecutive height data items are extracted from one line of height data using a certain sample point as the starting point, the median for the extracted height data items and the difference therefrom for each extracted height data item are calculated, and sample points with a difference that is at least a height threshold are extracted as singular point candidates. An interpolation unit (323) determines, to be a singular point, a singular point candidate having a number of consecutive repetitions that is less than a width threshold, deletes the height data for the determined singular point, interpolates the deleted height data using height data for sample points which are adjacent to and other than such singular point, and generates shape data for evaluating runout and bulge/dent.

7 Claims, 10 Drawing Sheets (51) Int. Cl.
*B60C 99/00* (2006.01)
*G01B 11/24* (2006.01)

(56) References Cited

U.S. PATENT DOCUMENTS

| | | | | |
|---|---|---|---|---|
| 9,196,034 B2* | 11/2015 | Noyel | ................... | G06T 7/0004 |
| 2007/0093981 A1* | 4/2007 | Reynolds | ............ | G01M 17/022 |
| | | | | 702/113 |
| 2009/0272183 A1* | 11/2009 | Sukegawa | .......... | G01B 11/2522 |
| | | | | 73/146 |
| 2011/0069323 A1* | 3/2011 | Takahashi | .............. | G01B 11/25 |
| | | | | 356/625 |
| 2012/0242824 A1* | 9/2012 | Takahashi | .......... | G01B 11/0608 |
| | | | | 348/86 |
| 2014/0219541 A1* | 8/2014 | Noyel | ....................... | G06T 5/30 |
| | | | | 382/141 |

FOREIGN PATENT DOCUMENTS

| | | | |
|---|---|---|---|
| JP | 2008-286703 A | | 11/2008 |
| JP | 2012272008 | * | 12/2012 |

OTHER PUBLICATIONS

The extended European search report issued by the European Patent Office dated Nov. 21, 2016, which corresponds to European Patent Application No. 14835055.6-1557 and is related to U.S. Appl. No. 14/894,886.

* cited by examiner

DATA GENERATION METHOD AND DATA GENERATION APPARATUS

TECHNICAL FIELD

The present invention relates to a technology for measuring the tread surface or a side wall of a tire and generating shape data to evaluate a budge/dent and the runout of the measured surface.

BACKGROUND ART

In general, tires have the following local defects due to the manufacturing process: low-frequency warp called runout and a shape having a slope larger than that of runout called bulge/dent. Accordingly, the shape of a surface to be measured of a tire is measured. Thereafter, the runout and bulge/dent are evaluated on the basis of obtained shape data, and it is determined whether the tire is defective.

In addition, due to the manufacturing process, the tires have a portion called burr or spew which has a width smaller than that of a bulge/dent and a height larger than that of the bulge/dent. If the shape data includes the shape of a burr or a spew, it is difficult to accurately evaluate the runout and the bulge/dent from the shape data.

Accordingly, PTL 1 describes a technique for calculating radial runout evaluation data to evaluate the radial runout by scanning a tread surface in the circumferential direction at a predetermined sampling period using a non-contact displacement meter to obtain height data for one round and removing a noise component from the height data. At that time, according to PTL 1, if the difference between the median of the height data items at a plurality of consecutive sample points, at the center of which there is a given sample point, and each of the height data items is greater than a threshold value, the height data item is determined to be a noise component.

However, in PTL 1, a value that is slightly greater than a normal variable value of the runout is used as the threshold value to extract the noise component. Accordingly, a bulge/dent and a normal runout that exceeds the normal variable value may be determined to be noise components and may be removed, which is problematic. In addition, according to PTL 1, a height data item that differs from the median by the threshold value or greater is simply determined to be a noise component and is removed without taking into account the number of consecutive height data items that differ from the median by the threshold value or greater. Accordingly, a height data item indicating a bulge/dent having a height that is substantially the same as the height of the noise component may be removed.

CITATION LIST

Patent Literature

PTL 1: Japanese Unexamined Patent Application Publication No. 2008-286703

SUMMARY OF INVENTION

The present invention provides a technology for generating shape data to accurately evaluate a runout and a budge/dent.

According to an aspect of the present invention, a data generating method for selecting one of the tread surface and the side wall surface of a tire as a surface to be measured and generating shape data used to evaluate a bulge/dent and a runout formed on the surface to be measured is provided. The data generation method includes the data acquiring step of scanning the surface to be measured using a shape sensor at a predetermined sampling period and acquiring height data items for one line, the candidate extraction step of providing a candidate extraction process to retrieve, from among the height data items for one line, a given number of consecutive height data items starting from a given sample point, calculate a difference between the median of the retrieved height data items and each of the retrieved height data items, and extract, as candidates of a singular point, the sample points each having the difference that is greater than or equal to a height threshold value and performing the candidate extraction process for the entire region of the height data items for one line while shifting the starting point, and an interpolation step of selecting, from among the candidates of a singular point, the candidates of a singular point that satisfy predetermined conditions as singular points, removing the selected singular points from the height data items, interpolating the height data items at the removed singular points using the height data items at the sample points that are neighbors of the singular point and that are not singular points, and generating the shape data. The height threshold value is a predetermined value that is greater than or equal to the product of the largest slope of the bulge/dent calculated from pre-generated model data representing the shape of the bulge/dent and half a width corresponding to the given number.

According to the present invention, the height data from which singular points have been accurately removed from the height data items for one line is generated. As a result, the shape data for accurately evaluating the runout and the bulge/dent can be obtained.

DESCRIPTION OF EMBODIMENTS

Figure 1:
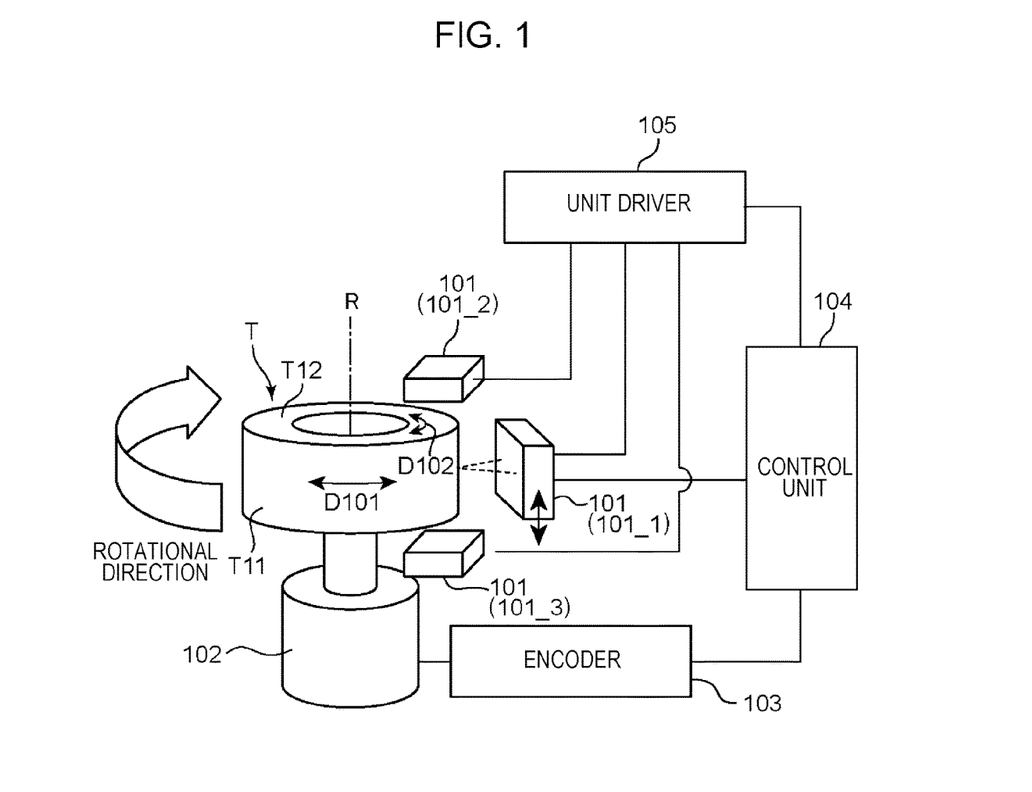
FIG. 1 illustrates the overall configuration of a data generation apparatus according to an embodiment of the present invention.

FIG. 1 illustrates the overall configuration of a data generation apparatus according to an embodiment of the present invention. The data generation apparatus is an apparatus that generates the shape data of a tread surface T11 or a side wall surface T12 of a tire T, which is a surface to be measured, to evaluate the runout and the bulge/dent of the surface. The term "runout" refers to a low-frequency warp (relatively gently varying irregularities) of a surface of the tire T to be measured. The runout is generated due to the manufacturing process of the tire T. In addition, the term "bulge/dent" refers to a local defect regarding a shape which has a slope larger than that of the runout. The bulge/dent is generated due to the manufacturing process of the tire T.

As illustrated in FIG. 1, the data generation apparatus includes shape sensors 101, a rotation unit 102, an encoder 103, a control unit 104, and a unit driver 105. The rotation unit 102 rotates the tire T about a rotation axis R serving as the central axis. More specifically, the rotation unit 102 includes, for example, a shaft attached to the central axis of the tire T and a motor that rotates the shaft. The rotational speed of the tire T rotated by the rotation unit 102 is set to, for example, 60 rpm.

The following three types of shape sensor 101 are provided: a shape sensor 101_1 provided adjacent to the tread surface T11 of the tire T, a shape sensor 101_2 provided adjacent to one of the side wall surfaces T12 of the tire T (on the upper side in FIG. 1), and a shape sensor 101_3 provided adjacent to the other side wall surface T12 (on the lower side in FIG. 1). The shape sensor 101_1 is used to measure the tread surface T11. The shape sensor 101_2 is used to measure one of the side wall surfaces T12, and the shape sensor 101_3 is used to measure the other side wall surface T12.

The shape sensor 101_1 emits a laser beam to the tread surface T11 of the tire T that is rotating and scans the tread surface T11 in a circumferential direction D101. Thus, the shape sensor 101_1 receives a reflection light beam from the tire T and acquires measurement data items for one line extending in the circumferential direction D101. Note that the circumferential direction D101 is a direction of the circumference of the tire T when the tire T is cut by a plane perpendicular to the rotation axis R.

Like the shape sensor 101_1, each of the shape sensors 101_2 and 101_3 emits a laser beam to the side wall surface T12 of the tire T that is rotating and scans the side wall surface T12 in a circumferential direction D102. Thus, each of the shape sensor 101_2 and 101_3 acquires measurement data items for one line extending in the circumferential direction D102. Note that when a concentric circle at the center of which is the rotation axis R is drawn on the side wall surface T12 so as to have a given radius, the circumferential direction D102 is defined as a direction of the circumference of the concentric circle.

The encoder 103 outputs, to the control unit 104, an angle signal indicating the rotation angle of the tire T each time the tire T rotates by a predetermined angle. The angle signal is used to determine the timing at which the shape sensor 101 performs measurement.

The control unit 104 is formed from, for example, a microcontroller. The control unit 104 performs a process described below on the measurement data items output from the shape sensor 101. The unit driver 105 includes three arm units (not illustrated) for positioning the shape sensors 101_1 to 101_3 and three motors for moving the three arm units. The unit driver 105 positions each of the shape sensors 101_1 to 101_3 under the control of the control unit 104.

Note that although the three shape sensors 101_1 to 101_3 are provided, as illustrated in FIG. 1, the number of shape sensors is not limited thereto. For example, any one or two of the three shape sensors 101_1 to 101_3 may be removed.

Figure 2:
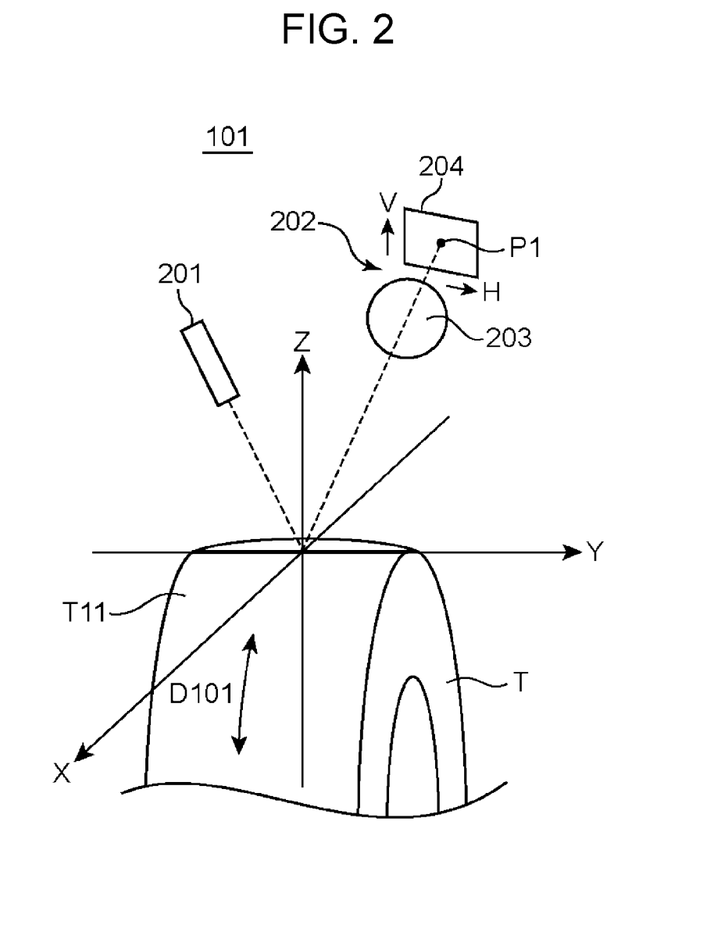
FIG. 2 is a detailed configuration diagram of a shape sensor.

FIG. 2 is a detailed configuration diagram of the shape sensor 101. In FIG. 2, the shape sensor 101_1 used to measure the tread surface T11 is illustrated. In FIG. 2, a Y axis indicates a direction parallel to the rotation axis R, a Z axis represents a normal direction of the tread surface T11, and an X axis represents a direction that is perpendicular to each of the Y axis and the Z axis.

A light source 201 is a light source including a semiconductor laser and a cylindrical lens. The light source 201 emits a spot-shaped laser beam to the tire T. At that time, the light source 201 emits the light beam in a direction that crosses the Z axis. Since the tire T is rotated by a rotation unit 2, the laser beam can scan the tread surface T11 of the tire T along the circumferential direction D101.

A camera 202 includes a camera lens 203 and an imaging element 204. The camera lens 203 leads a light beam reflected from the tread surface T11 to the imaging element 204. The imaging element 204 is formed from, for example, an image sensor, such as a CCD or CMOS. The imaging element 204 receives the reflected light beam via the camera lens 203. The imaging element 204 captures the image of the tread surface T11 under the control of the control unit 104. Note that it is desirable that the reflected light beam be a specular light beam. Accordingly, the camera lens 203 is configured so as to lead the specular light beam to the imaging element 204.

Figure 3:
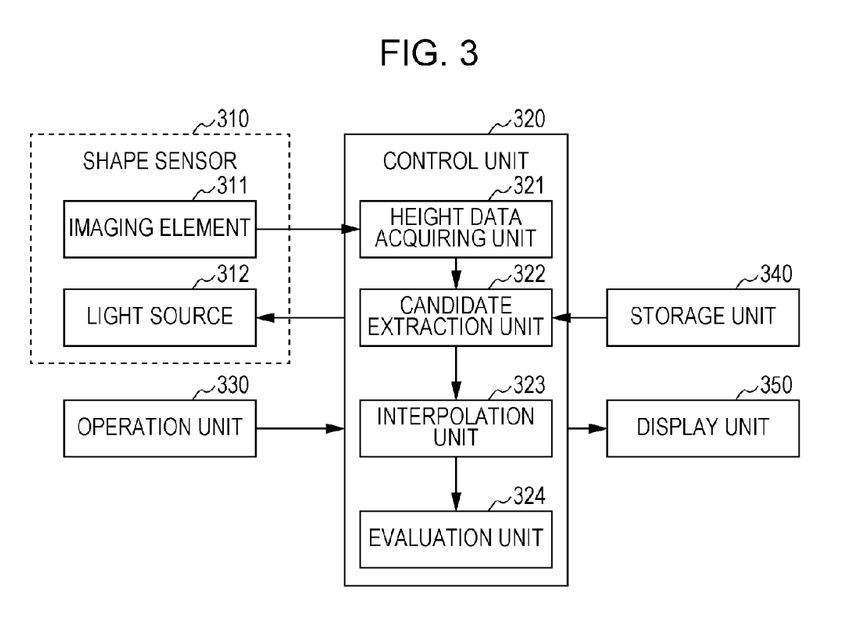
FIG. 3 is a block diagram of an example of the configuration of the data generation apparatus according to the embodiment of the present invention.

FIG. 3 is a block diagram of an example of the configuration of the data generation apparatus according to the embodiment of the present invention. The data generation apparatus includes a shape sensor 310, a control unit 320, an operation unit 330, a storage unit 340, and a display unit 350.

The shape sensor 310 contactlessly measures the shape of the tread surface T11 or the side wall surface T12 of the tire T serving as a surface to be measured. More specifically, the shape sensor 310 corresponds to the shape sensor 101 illustrated in FIG. 1. The shape sensor 310 includes an imaging element 311 and a light source 312. The imaging element 311 corresponds to the imaging element 204 illustrated in FIG. 2, and the light source 312 corresponds to the light source 201 illustrated in FIG. 2.

The control unit 320 corresponds to the control unit 104 illustrated in FIG. 1. The control unit 320 includes a height data acquiring unit 321, a candidate extraction unit 322, an interpolation unit 323, and an evaluation unit 324. The height data acquiring unit 321 scans a surface to be measured using the shape sensor 310 at a predetermined sampling period and acquires measurement data items for one line. Thereafter, the height data acquiring unit 321 calculates the height data items for one line using the principal of triangulation. According to the present embodiment, the height data items for one line extending on the tread surface T11 along the circumferential direction D101 illustrated in FIG. 1 or the height data items for one line extending on the side wall surface T12 along the circumferential direction D102 is acquired.

In an example illustrated in FIG. 2, if the horizontal direction H of the imaging element 204 is parallel to the Y axis, the coordinate of a light receiving point P1 in the vertical direction V varies with the height of the tread surface T11. Accordingly, the height data acquiring unit 321 instructs the imaging element 204 to continuously capture the images of the tread surface T11 of the tire T that is rotating with a laser beam being emitted at a predetermined frame rate. Thereafter, for example, the height data acquiring unit 321 plots the time-series coordinates of the light receiving point P1 in the vertical direction V in a two-dimensional coordinate space having the ordinate representing the coordinate of the light receiving point P1 in the vertical direction V and the abscissa representing the time axis. Subsequently, the height data acquiring unit 321 defines each of the plotted points as a sampling point and obtains the height data of the sampling point from the coordinate of the sampling point in the ordinate using the principal of triangulation. Thus, the height data acquiring unit 321 obtains the height data items for one line extending on the tread surface T11 along the circumferential direction D101. At that time, the number of the sampling points of the height data items for one line is set to, for example, 1000 to 5000. Accordingly, the height data items for one line form a data group including a plurality of height data items equal in number to the number of the sampling point.

The candidate extraction unit 322 retrieves, from among the height data items for one line, a predetermined number of consecutive height data items starting from a given sample point and calculates the difference between the median of the retrieved height data items and each of the retrieved height data items. Thereafter, the candidate extraction unit 322 performs a candidate extraction process for extracting a sample point having the difference that is greater than or equal to a height threshold value as a candidate of a singular point. Subsequently, the candidate extraction unit 322 shifts the starting point one by one so as to perform the candidate extraction process on the entire region of the height data items for one line. Thus, the candidate extraction unit 322 extracts the candidates of a singular point from among the height data items for one line.

Note that the singular points include the sample point indicating the height data that indicates a burr or a spew of the tire and an unmeasurable point of the shape sensor 310. The term "burr" refers to a thin projection generated when the tire T is produced from a mold. The term "spew" refers to a whisker-shaped projection generated when the tire T is produced using a mold. In addition, the term "unmeasurable point" refers to a sample point at which correct height data cannot be obtained since the laser beam is blocked. The height data of each of the burr, the spew, and the unmeasurable point are characterized in that they have an absolute value significantly greater than the absolute value of the height data of each of the runout and the bulge/dent. Thus, according to the present embodiment, a sample point at which the difference between the height data and the median is greater than or equal to the height threshold value is extracted as a candidate of a singular point.

In this case, the following value is employed as the height threshold value: a value obtained on the basis of the product of an estimated value of the largest slope of the bulge/dent calculated from the model data indicating the shape of pre-generated bulge/dent and half the length corresponding to a given number of the sample points retrieved from the height data items for one line in a single candidate extraction process.

The interpolation unit 323 selects the candidates of a singular point having the number of consecutive candidates of a singular point that is smaller than or equal to a width threshold value. Thereafter, the interpolation unit 323 removes the height data at the selected singular points and interpolates the removed height data using the height data items at the sample points that are adjacent to the singular points and that are not singular points. In this manner, the shape data for evaluating a runout and a bulge/dent is generated. Note that the width of each of a burr and a spew is smaller than the width of each of a runout and a bulge/dent. In addition, the number of consecutive unmeasurable points is smaller than the width of each of the runout and the bulge/dent. Thus, according to the present embodiment, a candidate of a singular point having the number of consecutive candidates of a singular point that is smaller than or equal to the width threshold value is selected as a singular point.

The evaluation unit 324 evaluates a runout and a bulge/dent of the tire T by analyzing the shape data generated by the interpolation unit 323. At that time, the evaluation unit 324 evaluates the runout and the bulge/dent of the tire T by, for example, performing Fourier transform on the shape data.

The operation unit 330 receives, from an operator, an operation indicating an instruction for operating the data generation apparatus and outputs the instruction to the control unit 320. The storage unit 340 is formed from, for example, a nonvolatile storage device and stores the height threshold value used by the candidate extraction unit 322 to perform the candidate extraction process. In addition, the storage unit 340 stores the width threshold value used by the interpolation unit 323 to select a singular point from among the candidates of a singular point.

The display unit 350 is formed from, for example, a liquid crystal display panel. The display unit 350 displays the shape data generated by the interpolation unit 323 and the result of evaluation performed by the evaluation unit 324.

Figure 4:
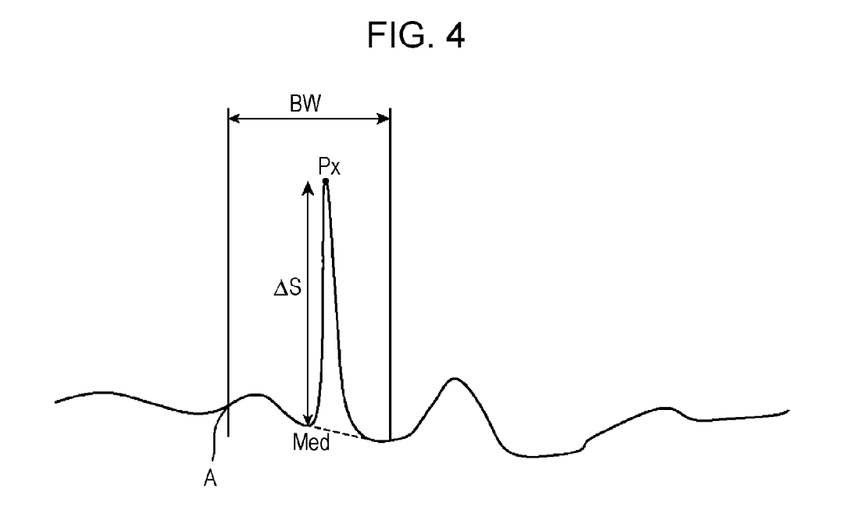
FIG. 4 is a schematic illustration of the process performed by a candidate extraction unit to remove a singular point.

FIG. 4 is a schematic illustration of the process performed by the candidate extraction unit 322 to remove a singular point. The candidate extraction unit 322 applies a median filter having a width BW corresponding a sampling zone that corresponds to a given number B illustrated in FIG. 4 to the height data items for one line starting from a starting point A and obtains a median Med of the height data items within the width BW. Thereafter, the candidate extraction unit 322 calculates a difference $\Delta S$ between the median Med and height data Px at each of the sample points within the width $\Delta W$. Subsequently, the candidate extraction unit 322 extracts, as a candidate of a singular point, the sample point having the difference $\Delta S$ that is greater than or equal to a height threshold value TH1.

Figure 5:
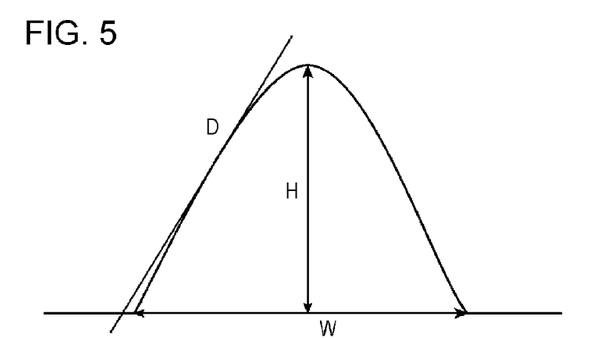
FIG. 5 illustrates an example of model data indicating the shape of a bulge/dent.

The height threshold value TH1 can be expressed as follows:

$$TH1 = D \cdot ((B-1)/2) \quad (1)$$

where D denotes the largest slope of the bulge/dent estimated from model data indicating the shape of the bulge/dent illustrated in FIG. 5. Note that B is decremented by one in equation (1). This is because the width BW is expressed as the number of the sample points obtained by subtracting the starting point A from the given number B.

FIG. 5 illustrates an example of the model data indicating the shape of a bulge/dent. Experience shows that the shape of a bulge/dent can be approximated by the shape of normal distribution. Thus, according to the present embodiment, model data generated in the following manner is employed, for example. That is, by using actual measured values of the shape data items of bulges/dents of a plurality of tires T, a width W and a height H of each bulge/dent are determined first. Thereafter, the normal distribution (Gaussian distribution) function is fitted to the determined width W and height H. In this manner, the normal distribution function that approximates the shape of each bulge/dent is obtained. Thereafter, each of the normal distribution functions is differentiated to obtain the largest slope value of the normal distribution function, and the normal distribution function having the largest slope value among the obtained slope values is employed as the model data.

The reason why the normal distribution function having the largest slope value is employed as the model data is that the height data items of the runout and the bulge/dent within the width BW when the median Med is used as a reference are less than or equal to a value obtained by multiplying the largest slope by half the width BW.

As described above, since the height data item indicating a singular point has a spike shape, only one or several height data items are consecutive in the circumferential direction D101 and the circumferential direction D102. Conversely, if a given number of height data items each indicating a certain level of height are consecutive, the height data represents a bulge/dent. In addition, since as described above, a bulge/dent has the shape of the normal distribution, the largest slope D of the bulge/dent can be estimated from the shape of the normal distribution.

In addition, when the height data items within the width BW are retrieved from the height data items for one line and if the largest value of the height data item indicating a bulge/dent with reference to the median Med can be estimated, the largest value or a value obtained by adding a slight margin to the largest value can be used as the height threshold value TH1. In this manner, the height data indicating a bulge/dent within the width BW can be distinguished from the height data indicating a singular point. In addition, since the slope of a runout is smaller than that of a bulge/dent, the height data of the runout when the median Med is used as a reference does not exceed the height threshold value TH1.

Alternatively, to distinguish each of the runout and the bulge/dent from a singular point, a difference between the average of the height data items when the given number B of the height data are retrieved from among the height data items for one line and the height data of each of the sample points may be compared with a height threshold value. However, in many cases, the height data item at a singular point is significantly larger than the height data item at a normal sample point. Thus, the average easily becomes an unstable value depending on the number of singular points included in the given number B of sample points and a variety of other factors, which is problematic. Thus, according to the present embodiment, the median that is negligibly affected by a singular point is employed.

Note that the term "median" refers to the value of a data item positioned in the middle when a given number B of data items are arranged in ascending order. For example, if the given number B is 15, the median is the 8th smallest value.

Figure 6:
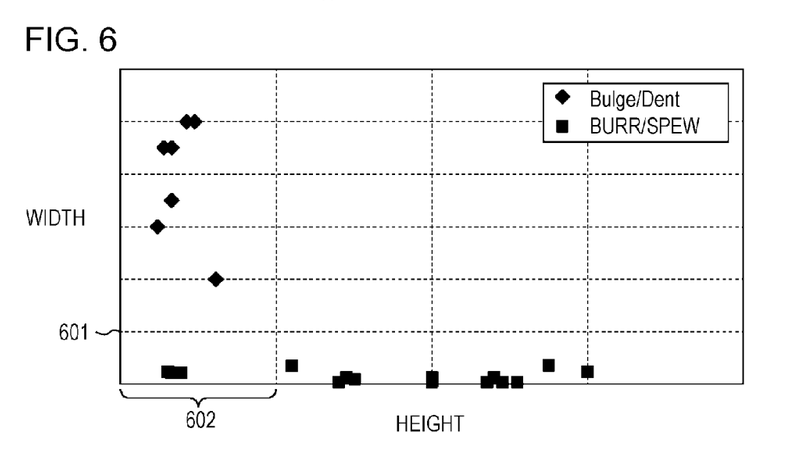
FIG. 6 is a graph illustrating the shape distributions of a bulge/dent and a burr/spew.

FIG. 6 is a graph illustrating the shape distributions of bulge/dents and burrs/spews. The ordinate represents the width, and the abscissa represents the height. In FIG. 6, a plot having a diamond shape represents a bulge/dent, and a plot having a shape of a square represents a burr or a spew. As illustrated in FIG. 6, in general, the height of the bulge/dent is smaller than that of each of a burr and a spew, but the width of the bulge/dent is larger than that of each of a burr and a spew. In an example illustrated in FIG. 6, in terms of the width, the bulges/dents are distributed above a border line indicated by a width 601. In contrast, the burr and the spew are distributed under the border line indicated by a width 601. Accordingly, in terms of the width, if the number of consecutive height data items is greater than or equal to the width 601, it can be determined to be the bulge/dent. However, if the number of consecutive height data items is less than the width 601, it can be determined to be a burr or a spew.

In terms of the height, bulges/dents, burrs, and spews are mixed in an area 602. Accordingly, a bulge/dent cannot be distinguished from each of a burr and a spew by simply setting the height threshold value. Thus, according to the present embodiment, the height data item that differs from the median by the height threshold value TH1 or greater is defined as a candidate of a singular point. If the number of consecutive candidates of a singular point is less than or equal to the width threshold value, the consecutive candidates of a singular point are determined to be singular points.

Figure 7:
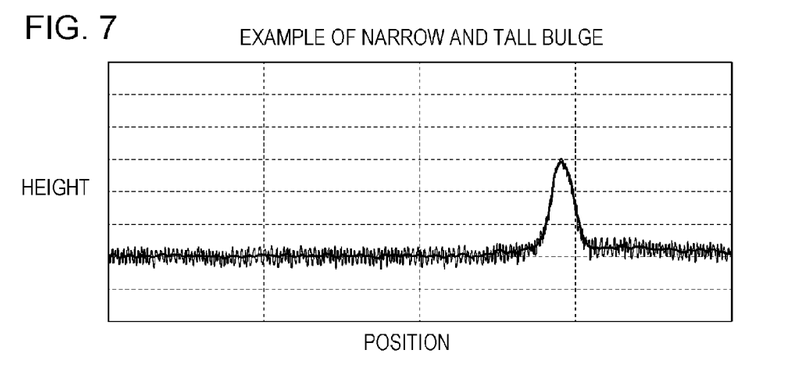
FIG. 7 is a graph indicating the shape of a narrow and tall bulge/dent.

Some bulges/dents are narrow and tall. FIG. 7 is a graph indicating the shape of a narrow and tall bulge/dent. In FIG. 7, the ordinate represents the height, and the abscissa represents the position. Study of the shapes of bulges/dents measured in the past indicates that the largest height of a bulge/dent is about 1.2 mm and the width is about 20 points at minimum. Thus, according to the present embodiment, a value obtained by taking into account the width of the bulge/dent having an elongated shape as illustrated in FIG. 7 is employed as the width threshold value used to extract a singular point from among the candidates of a singular point.

Figure 8:
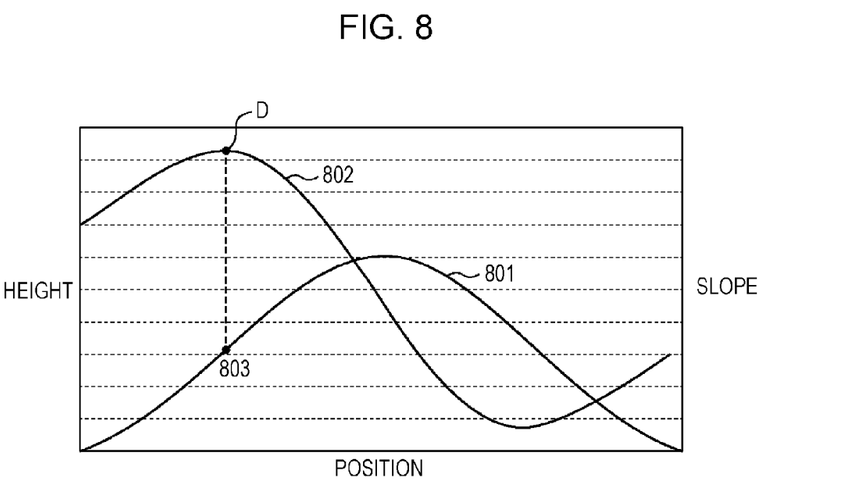
FIG. 8 is a graph indicating the shape and the slope of the model data of a bulge/dent.

FIG. 8 is a graph indicating the shape and the slope of the model data of a bulge/dent. In FIG. 8, the left ordinate represents the height, the right ordinate represents the slope, and the abscissa represents the position. In addition, in FIG. 8, a graph 801 indicates the shape of the model data of the bulge/dent, and a graph 802 indicates the slope of the model data of the bulge/dent.

As can be seen from the graph 801, the model data of a bulge/dent has the shape of normal distribution. In addition, as can be seen from the graph 802, the largest slope D is positioned at an inflection point 803 in the graph 801.

Figure 9:
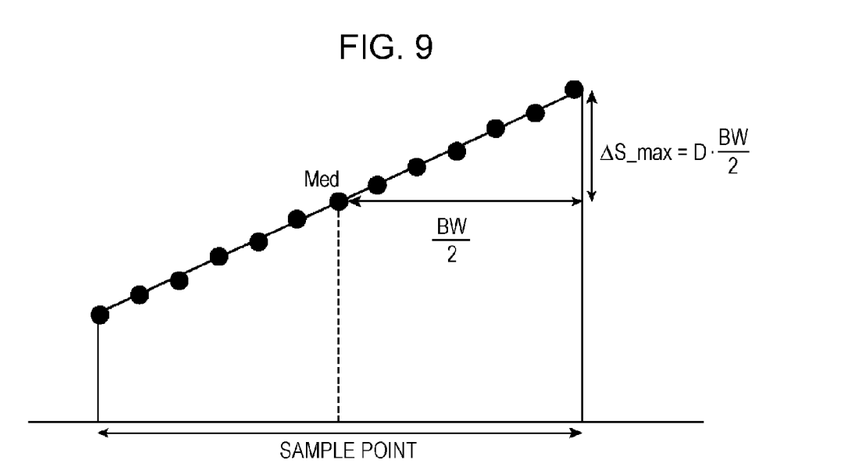
FIG. 9 is a graph indicating the estimated value of the largest value of the height data of a bulge/dent when the median is used as a reference.

FIG. 9 is a graph indicating an estimated value of the largest value ΔS_max of the height data of the bulge/dent when the median Med is used as a reference. In FIG. 9, the ordinate represents the height, and the abscissa represents the width BW of the median filter. If the median filter is set so that the median Med is positioned at a position of the largest slope D of the bulge/dent, it is estimated that the largest value ΔS_max of the difference ΔS between the height data indicating the bulge/dent and the median Med is D·(BW/2). That is, it is estimated that the difference ΔS does not exceed the largest value ΔS_max even when the median filter is set in any zone of the height data items for one line. Accordingly, by using D·(BW/2) as the height threshold value TH1, the height data indicating the runout and the bulge/dent can be distinguished from the height data indicating a singular point. Thus, according to the present embodiment, D·(BW/2), that is, the above-described equation (1) is employed as the height threshold value TH1. Alternatively, a value obtained by adding a slight margin to D·(BW/2) may be employed as the height threshold value TH1.

If the width BW of the median filter is too large, the influence of a change in the overall shape and all the runout and bulges/dents may be determined to be the singular points. Accordingly, the width BW needs to be a value smaller than at least the estimated smallest width of the bulge/dent (20 points in the example illustrated in FIG. 7). In contrast, if the width BW is too short, singular points may be consecutive in a zone that is larger than half the width BW. In such a case, since the median is set as a singular point, a singular point may not be correctly removed. Thus, according to the present embodiment, the width BW is set so as to satisfy the conditions that the width BW is smaller than the smallest width of the bulge/dent obtained from the result of measurements performed in the past and half the width BW(=BW/2) is larger than the width of the singular points obtained from the result of measurements performed in the past. Note that if the smallest width of a bulge/dent and the width of the singular points can be estimated from the type of tire T to be measured, the width BW that satisfies conditions in accordance with the type of the tire T may be set.

Figure 10:
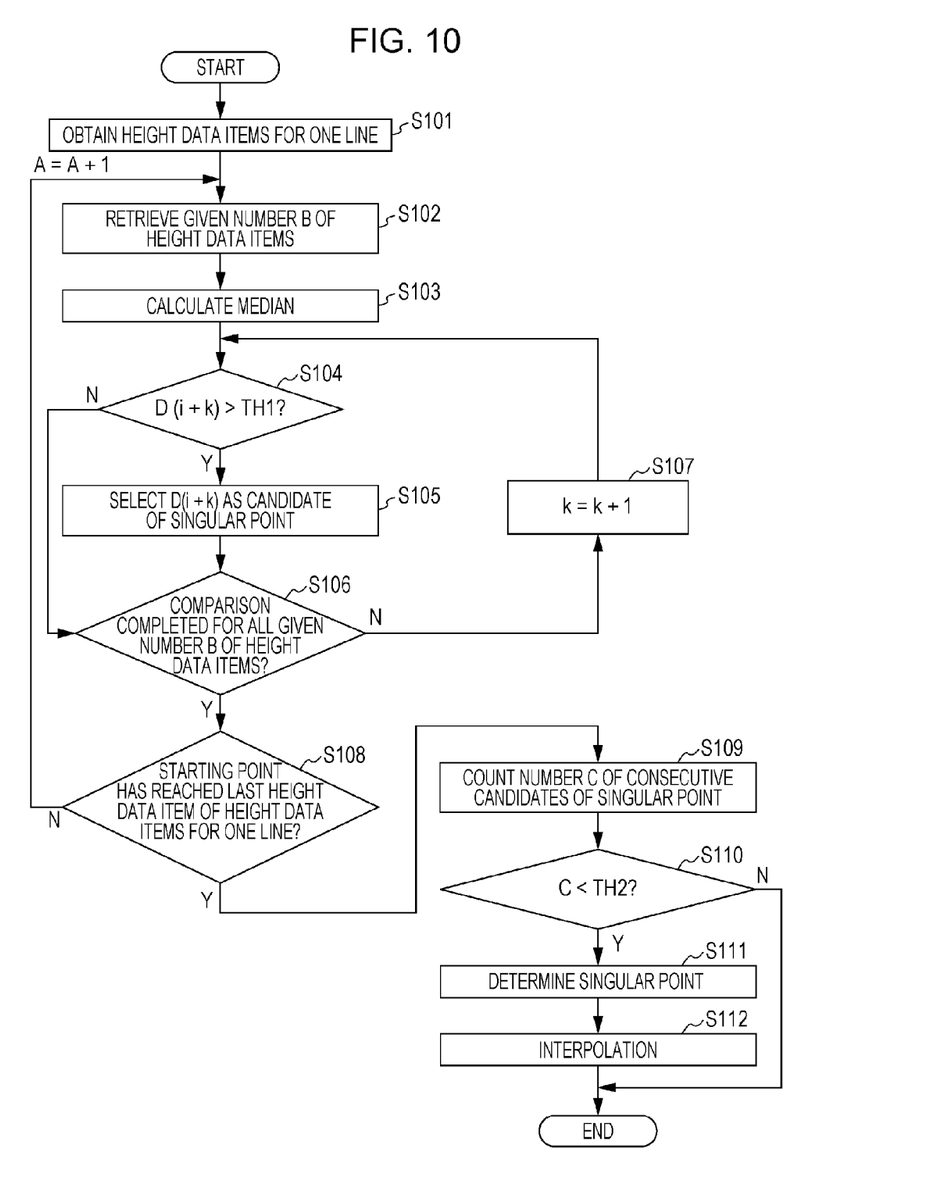
FIG. 10 is a flowchart of the operation performed by the data generation apparatus according to the embodiment of the present invention.

FIG. 10 is a flowchart of the operation performed by the data generation apparatus according to the embodiment of the present invention. The height data acquiring unit 321 instructs the shape sensor 310 to scan the tire T and acquires height data items D(i) for one line first (S101).

Subsequently, the candidate extraction unit 322 defines a given sample point as the starting point A and sets the median filter in the height data items D(i) for one line. Thereafter, a given number B of height data items D(i) are retrieved (S102). Note that i is an integer greater than or equal to zero and represents an index indicating the position of the sample point. In the following description, it is defined that the height data is located at a sample point on the rearward side with increasing i, and it is defined that the height data is located at a sample point on the frontward side with decreasing i. In addition, in the first processing, the starting point A is set to the sample point having i=0.

Subsequently, the candidate extraction unit 322 calculates the median Med of a given number B of the data items D(i) that are retrieved (S103).

Subsequently, the candidate extraction unit 322 selects height data item D(i+k) of interest from among the retrieved height data items D(i) and determines whether the height data item D(i+k) of interest is greater than the height threshold value TH1 (S104), where k is an integer that is greater than or equal to 0 and less than or equal to B−1.

Subsequently, if the height data item D(i+k) of interest is greater than the height threshold value TH1 ("Y" in S104), the candidate extraction unit 322 selects the sample point of the height data item D(i+k) of interest as a candidate of a singular point (S105). However, if the height data item D(i+k) of interest is less than or equal to the height threshold value TH1 ("N" in S104), the processing proceeds to S106.

In S106, if comparison of the height data item D(i) and the height threshold value TH1 is completed for all given number B of the height data items D(i) ("Y" in S106), the processing performed by the candidate extraction unit 322 proceeds to S108. However, the comparison of the height data item D(i) and the height threshold value TH1 has not yet been completed for all given number B of the height data items D(i) ("N" in step S106), the candidate extraction unit 322 increments k by one to select the next height data item D(i+k) of interest (S107). Thereafter, the processing returns to S104.

Subsequently, if the starting point A has reached the last height data item D(i) of the height data items D(i) for one line retrieved in S101 ("Y" in S108), the processing of the candidate extraction unit 322 proceeds to S109. However, if the starting point A has not yet reached the last height data item D(i) of the height data items D(i) for one line retrieved in S101, the candidate extraction unit 322 ("N" in S108), the processing of the candidate extraction unit 322 returns to S102, where the starting point A is shifted to the sample point that is a rear neighbor of the starting point A. In addition, the median filter is set for the height data items D(i) for one line, and a given number B of the height data items are retrieved (S102). Thereafter, the processes in the steps subsequent to S102 are repeated.

That is, the candidate extraction unit 322 shifts the starting point A by one sample point in the height data items for one line and applies the median filter to the height data items and retrieves a predetermined number B of height data items.

In S109, the interpolation unit 323 counts the number C of the consecutive candidates of a singular point. Subsequently, if the number C of the consecutive candidates of a singular point is smaller than a width threshold value TH2 ("Y" in S110), the interpolation unit 323 selects the candidates of a singular point as singular points (S111).

For example, when the width threshold value TH2 is 10 and if five sample points of the height data items D(4) to D(8) are selected as the candidates of a singular point, the sample points (4) to (8) are determined to be singular points.

Subsequently, the interpolation unit 323 removes the singular points and interpolates the height data at the removed sample points using the height data items at the front neighbor and rear neighbor (other than a singular point) of the removed sample point (S112). In the above-described example, the height data items D(4) to D(8) are removed. Thereafter, by performing linear interpolation using the height data of one or more sample points that are front neighbors of the height data D(4) and that are not singular points and the height data of one or more sample points that are rear neighbors of the height data D(8), the height data items at the sample points (4) to (8) are calculated. Thus, the height data items D(4) to D(8) are interpolated. While linear interpolation is employed in this example, the linear interpolation is only an example. For example, another interpolation technique, such as spline interpolation, may be employed.

Note that in the flowchart illustrated in FIG. 10, the sample point (i+k) that is determined at least once in S104 to satisfy the condition that the height data item D(i+k) of interest>the height threshold value TH1 is selected as a candidate of a singular point. However, the processing is not limited thereto. For example, a sample point that is determined to satisfy the condition that the height data item D(i+k) of interest>the height threshold value TH1 more than predetermined times may be selected as a candidate of a singular point.

In addition, in the flowchart illustrated in FIG. 10, the starting point A is shifted by one sample point by the process in S102, the process is not limited thereto. The starting point A may be shifted by a plurality of points or the given number B each time.

The effect of removal of a singular point in the data generation apparatus is described below with reference to FIGS. 11 to 14. FIGS. 11 to 14 are graphs indicating the height data before and after the singular point is removed. The ordinates represent the height, and the abscissae represent the position. Note that in FIGS. 11 to 14, the dotted line indicates the height data before processing, and the solid line indicates the height data after the processing.

As can be seen from the drawings, the sample point having the height data item that extends in a whisker shape among the height data items before the processing is determined to be a singular point and is removed from the height data items after processing. Note that the height data item in an area surrounded by the dotted line is the height data item of a bulge/dent that is intentionally added. In the height data items after the processing, the height data item of the bulge/dent still remains. Thus, it can be seen that the height data item indicating a bulge/dent is accurately distinguished from the height data item indicating a singular point.

Figure 11:
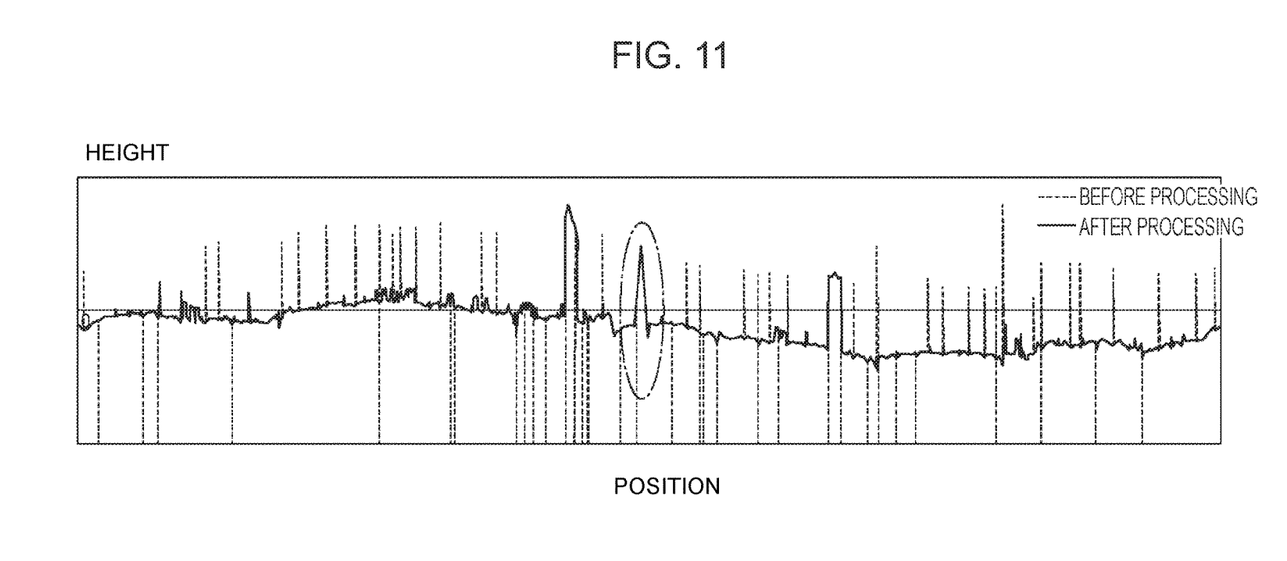
FIG. 11 is a graph indicating the height data before a singular point is removed and the height data after the singular point is removed.
Figure 12:
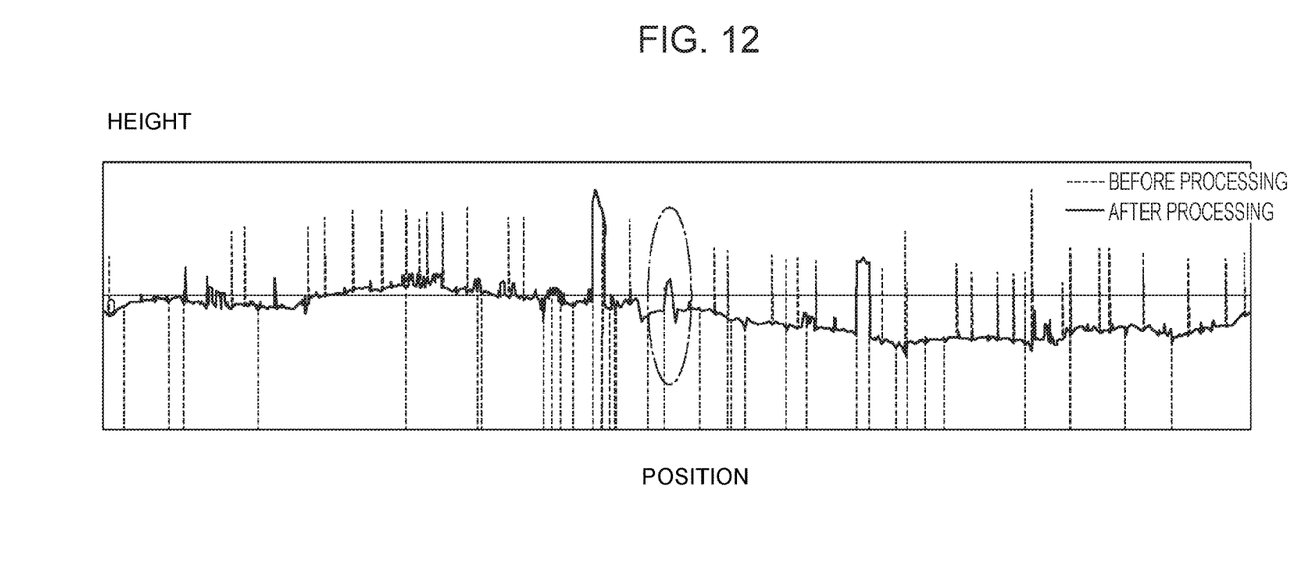
FIG. 12 is a graph indicating the height data before a singular point is removed and the height data after the singular point is removed.

In FIG. 12, the height data item intentionally added into the area surrounded by the dotted line has a width that is the same as that in FIG. 11, but the height is decreased to 1/2.4 of the height in FIG. 11. Even in FIG. 12, the height data item of the bulge/dent that is intentionally added still remains. Thus, it can be seen that the bulge/dent is accurately extracted. In addition, the height data item of the singular point that extends in a whisker shape among the height data items before the processing is removed from the height data items after the processing. Thus, it can be seen that the height data item of the singular point is accurately removed.

Figure 13:
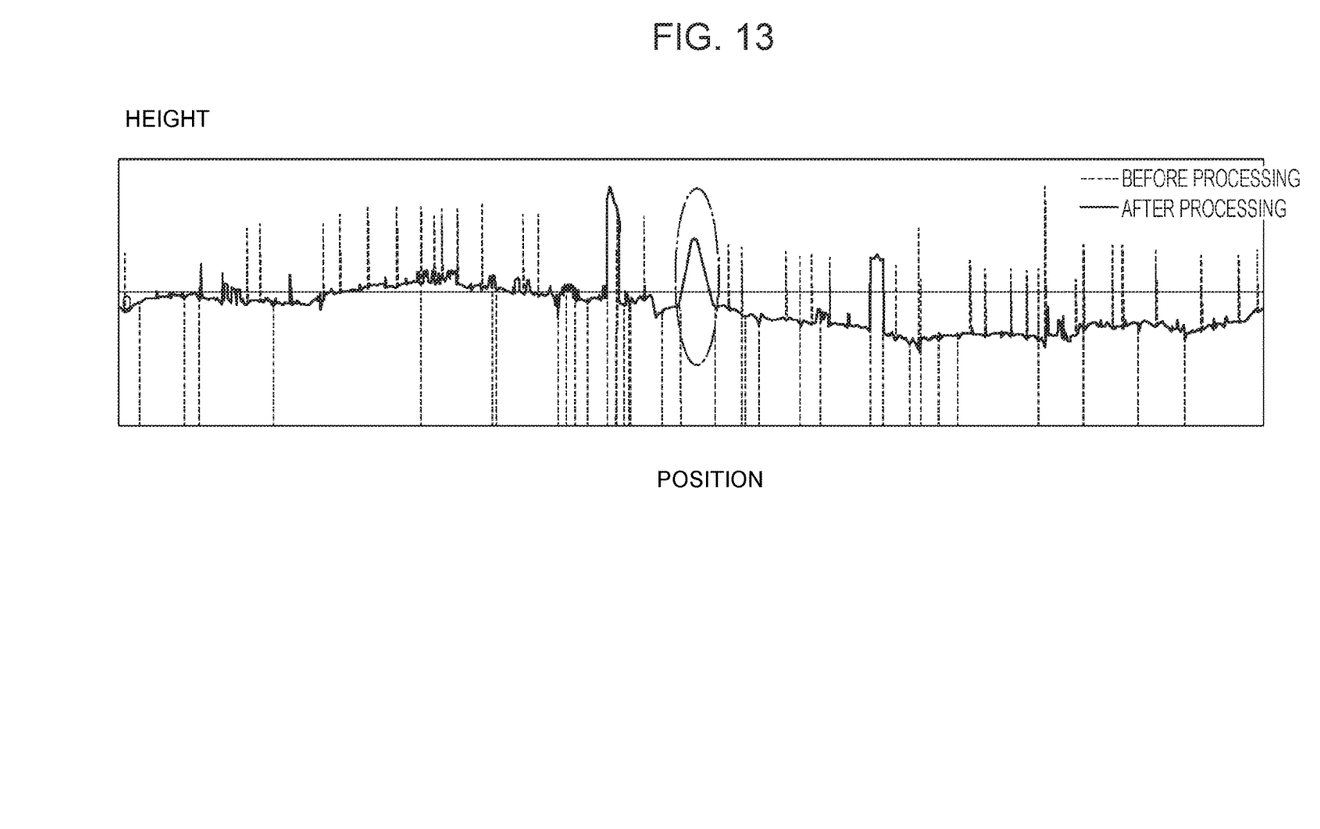
FIG. 13 is a graph indicating the height data before a singular point is removed and the height data after the singular point is removed.
Figure 14:
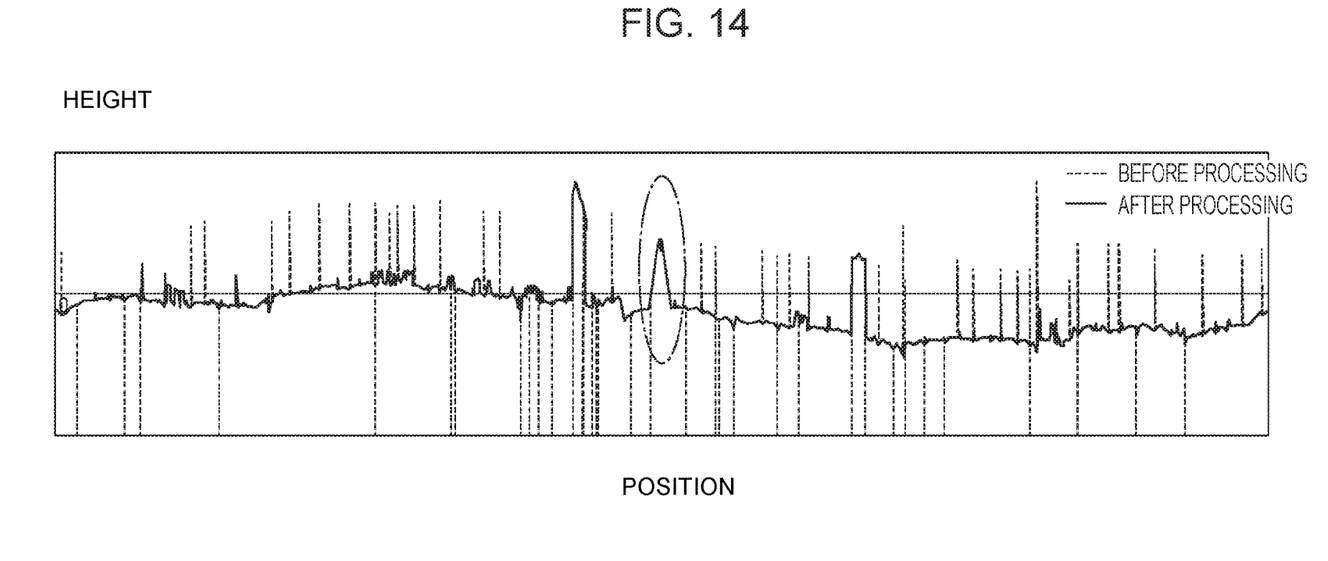
FIG. 14 is a graph indicating the height data before a singular point is removed and the height data after the singular point is removed.

Subsequently, the width of a bulge/dent is discussed. In general, it is more difficult to extract a bulge/dent with decreasing width of the bulge/dent. FIG. 13 and FIG. 14 illustrate the state of removal when the width is changed.

In FIG. 13, the height data item of the bulge/dent intentionally added into the area surrounded by the dotted line has a height that is the same as that in FIG. 11, but the width is increased to three times the width in FIG. 11. In FIG. 14, the height data item of the bulge/dent intentionally added into the area surrounded by the dotted line has a height that is the same as that in FIG. 11, but the width is increased to double the width in FIG. 11.

Even in FIG. 13 and FIG. 14, the height data item of the bulge/dent intentionally embedded still remains in the height data items after the processing. Thus, it can be seen that the bulge/dent is accurately extracted.

While the above description has been made with reference to only a bulge serving as the bulge/dent, the data generation apparatus is applicable to a dent, which is a concave portion. Since only plus and minus are reversed, the same performance can be obtained for all bulges/dents.

While the above description has been made with reference to a device that captures the image of the tire T using the imaging element 311 serving as the shape sensor 310, the device is only an example. Any shape sensor that contactlessly measures the surface shape of the tire T can be employed. An example of such a shape sensor is a laser displacement meter.

In addition, the blocks of the control unit 320 illustrated in FIG. 3 may be realized by a processor that executes a data generation program causing a computer to function as the data generation apparatus. In such a case, the data generation program may be stored in a computer-readable recording medium, such as CDROM, and may be provided to the users. Alternatively, the data generation program may be provided to the users by allowing the users to download the data generation program from a WEB server.

SUMMARY OF EMBODIMENTS

According to an aspect of the present invention, a data generation method for selecting one of the tread surface and the side wall surface of a tire as a surface to be measured and generating shape data used to evaluate a bulge/dent and a runout formed on the surface to be measured is provided. The data generation method includes the data acquiring step of scanning the surface to be measured using a shape sensor at a predetermined sampling period and acquiring height data items for one line, the candidate extraction step of providing a candidate extraction process to retrieve, from among the height data items for one line, a given number of consecutive height data items starting from a given sample point, calculate a difference between the median of the retrieved height data items and each of the retrieved height data items, and extract, as candidates of a singular point, the sample points each having the difference that is greater than or equal to a height threshold value and performing the candidate extraction process for the entire region of the height data items for one line while shifting the starting point, and an interpolation step of selecting, from among the candidates of a singular point, the candidates of a singular point that satisfy predetermined conditions as singular points, removing the selected singular points from the height data items, interpolating the height data items at the removed singular points using the height data items at the sample points that are neighbors of the singular point and that are not singular points, and generating the shape data. The height threshold value is a predetermined value that is greater than or equal to the product of the largest slope of the bulge/dent calculated from pre-generated model data representing the shape of the bulge/dent and half a width corresponding to the given number.

According to such a configuration, the height threshold value is a predetermined value that is greater than or equal to the product of the largest slope of a bulge/dent calculated from the model data representing the shape of the bulge/dent and half the width corresponding to the given number. At that time, it can be estimated that the largest value of the height data indicating a runout and a bulge/dent when the median is used as a reference within the width of a given number of the height data items retrieved from the height data items for one line is a value obtained by multiplying the largest slope of the bulge/dent by half the width corresponding to the given number, since the slope of the bulge/dent is larger than the slope of a runout. According to the present configuration, the height threshold value is set to a value that is greater than or equal to the largest value estimated in this manner. As a result, the height data item of a candidate of a singular point can be accurately removed from the height data items for one line. In addition, from among the candidates of a singular point, the candidates of a singular point that satisfy predetermined conditions are selected as singular points, and the selected singular points are removed. The height data items of the removed singular points are generated by interpolating the height data item of the sample point that is a neighbor of the removed singular point and that is not a singular point. Accordingly, the shape data in which the singular points are accurately removed from the height data items for one line can be acquired and, thus, a bulge/dent and a runout can be accurately evaluated using the shape data.

In addition, according to the above-described aspect, the shape sensor is a non-contact displacement meter, and the above-described singular points may include a sample point indicating a burr and a spew of the tire and an unmeasurable point of the non-contact displacement meter.

According to such a configuration, the shape data from which sample points indicating a burr and a spew and an unmeasurable point of the non-contact displacement meter are removed can be acquired.

In addition, according to the above-described aspect, in the above-described interpolation step, the consecutive candidates of a singular point equal in number to a width threshold value or less may be determined to be the singular points.

If a singular point is determined on the basis of only the height data, a burr and a spew having a height that is substantially the same as that of a runout and a bulge/dent may not be determined as a singular point. Note that the width of each of a runout and a bulge/dent is larger than the width of each of a burr, a spew, and the number of consecutive unmeasurable points. Thus, according to the present configuration, the consecutive candidates of a singular point that are equal in number to the width threshold value or less are determined to be the singular points. In this manner, the height data indicating a burr and a spew can be accurately removed from the height data items for one line.

In addition, according to the present aspect, the model data may be generated by fitting a normal distribution function to actually measured height and width of the bulge/dent, and the largest slope may be obtained by differentiating the normal distribution function.

It is known that the shape of a bulge/dent can be approximated by the normal distribution. Accordingly, by fitting a normal distribution function to the actually measured width and height, the model data can be accurately generated in a simple manner. In addition, since the model data is expressed by the normal distribution function, the largest slope can be easily obtained by differentiation.

The invention claimed is:

1. A data generation method for selecting one of a tread surface and a side wall surface of a tire as a surface to be measured and generating shape data used to evaluate a bulge/dent and a runout formed on the surface to be measured, comprising:
   a data acquiring step of scanning the surface to be measured using a shape sensor at a predetermined sampling period and acquiring height data items for one line;
   a candidate extraction step of providing a candidate extraction process to retrieve, from among the height data items for one line, a given number of consecutive height data items starting from a given sample point, calculate a difference between the median of the retrieved height data items and each of the retrieved height data items, and extract, as candidates of a singular point, the sample points each having the difference that is greater than or equal to a height threshold value and performing the candidate extraction process for an entire region of the height data items for one line while shifting the starting point;
   an interpolation step of selecting, from among the candidates of a singular point, the candidates of a singular point that satisfy predetermined conditions as singular points, removing the selected singular points from the height data items, interpolating the height data items at the removed singular points using the height data items at the sample points that are neighbors of the singular point and that are not singular points, and generating the shape data,
   wherein the height threshold value is a predetermined value that is greater than or equal to the product of a largest slope of the bulge/dent calculated from pre-generated model data representing the shape of the bulge/dent and half a width corresponding to the given number of consecutive height data items, and
   wherein the singular points include a sample point indicating a burr or a spew of the tire; and
   an evaluation step of removing the height data indicating the burr or the spew from the height data items for one line.

2. The data generation method according to claim 1, wherein the shape sensor is a non-contact displacement meter, and
   wherein the singular points include a sample point indicating an unmeasurable point of the non-contact displacement meter.

3. The data generation method according to claim 1, wherein in the interpolation step, consecutive candidates of a singular point equal in number to a width threshold value or less are determined to be the singular points.

4. The data generation method according to claim 1, wherein the model data is generated by fitting a normal distribution function to actually measured height and width of the bulge/dent, and the largest slope is obtained by differentiating the normal distribution function.

5. The data generation method according to claim 1, wherein the evaluation step includes determining whether the tire is defective after the height data indicating the burr or the spew is removed from the height data items for one line.

6. A data generation apparatus for selecting one of a tread surface and a side wall surface of a tire as a surface to be measured and generating shape data used to evaluate a bulge/dent and a runout formed on the surface to be measured, comprising:
   a shape sensor;
   a height data acquiring unit configured to scan the surface to be measured using the shape sensor at a predetermined sampling period and acquire height data items for one line;
   a candidate extraction unit configured to provide a candidate extraction process to retrieve, from among the height data items for one line, a given number of consecutive height data items starting from a given sample point, calculate a difference between the median of the retrieved height data items and each of the retrieved height data items, and extract, as candidates of a singular point, the sample points each having the difference that is greater than or equal to a height threshold value and perform the candidate extraction process for an entire region of the height data items for one line while shifting the starting point;
   an interpolation unit configured to select, from among the candidates of a singular point, the candidates of a singular point that satisfy predetermined conditions as singular points, remove the selected singular points from the height data items, interpolate the height data items at the removed singular points using the height data items at the sample points that are neighbors of the singular point and that are not singular points, and generate the shape data,
   wherein the height threshold value is a predetermined value that is greater than or equal to the product of a largest slope of the bulge/dent calculated from pre-generated model data representing the shape of the bulge/dent and half a width corresponding to the given number of consecutive height data items, and
   wherein the singular points include a sample point indicating a burr or a spew of the tire; and
   an evaluation unit configured to remove the height data indicating the burr or the spew from the height data items for one line.

7. The data generation method according to claim 6, wherein the evaluation unit is configured to determine whether the tire is defective after the height data indicating the burr or the spew is removed from the height data items for one line.

* * * * *